May 29, 1956  H. G. BENNISON  2,747,908
FASTENER
Filed Nov. 17, 1953

INVENTOR
Henry G. Bennison
By Watson, Cole, Grindle & Watson
ATTORNEYS

United States Patent Office 2,747,908
Patented May 29, 1956

2,747,908

FASTENER

Henry George Bennison, London, England, assignor to Microcell Limited, London, England, a British company Application November 17, 1953, Serial No. 392,670

8 Claims. (Cl. 292—241)

This invention relates to fasteners particularly for clamping a closure wall of a container against abutting portions on the other walls whereby an effective seal may be obtained.

According to this invention a fastener for clamping one part against an abutment on another part comprises an element rotatable on the one part about an axis extending in the direction of the clamping movement, a shoulder or the like on the other part having its face directed towards said abutment, which rotatable element is so shaped as to provide a peripheral face transverse to the axis of rotation and which may be moved from a position where it overlaps a face of the shoulder to a position in which it is clear of the shoulder and which face of the element is so shaped as to effect a wedging action when rotated in contact with the shoulder.

Means may be provided for locking the rotatable element in a clamping position.

The rotatable element may be in the form of a comparatively thin plate having aforesaid peripheral face on one side thereof; a spindle may be fixed to the plate and extend through a bearing in a housing adapted to be secured to the first said part, a projecting end of which spindle either carries a manipulating handle or is arranged to receive an operating key.

In the case where it is provided with a manipulating handle the handle may be hinged to the spindle to swing about an axis transverse to the axis of the spindle so as to lie flat against the housing and the aforesaid locking means may be arranged to engage said handle when in the latter position.

The locking means may comprise a projection on the housing which is arranged to extend through a hole in the manipulating member when in said latter position. The projection is also provided with a hole for receiving a locking member such as a split pin which lies on the outside of the handle.

The aforesaid housing may comprise two plates arranged face to face one or both of which are pressed to provide a recess or channel extending to at least one edge of each plate in which recess said rotatable element is located so that in a clamping position its periphery may project beyond said edge.

The plates may be sector shaped and the rotatable element is arranged when in a clamping position to project beyond the outlet portions of the plate.

The aforesaid shoulder may be formed on a second element for attachment to said other part.

It may comprise a metal plate having a slot formed therein to provide said shoulder. The second element may be formed with or may have the aforesaid abutment secured thereto.

The invention includes within its scope a container having a closure wall encircled by the other walls of the container which are provided with abutment portions against which the closure wall rests and one or more fasteners as set out above for clamping the closure wall against said abutments, but showing the manipulating handle in an extending position.

The following is a description of one form of the invention reference being made to the accompanying drawings in which.

Figure 1:
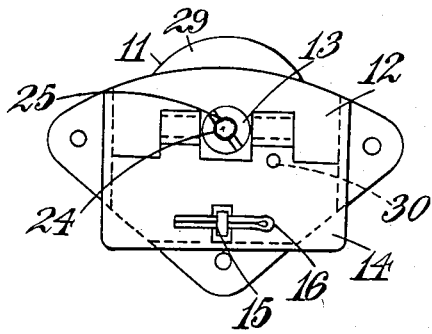
Figure 1 is a plan view of the fastener showing the handle in a locked position.
Figure 2:
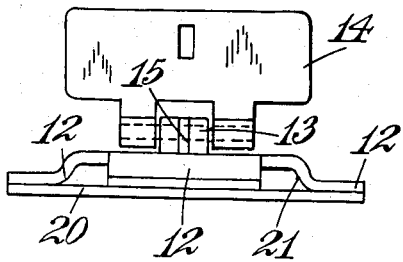
Figure 2 is a side elevation.
Figure 3:
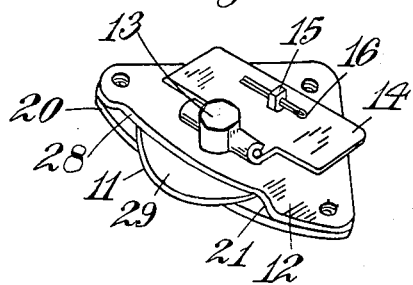
Figure 3 is a perspective view of the fastener.
Figure 4:
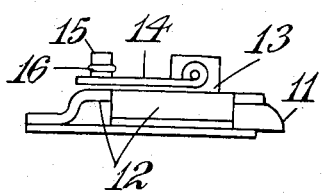
Figure 4 is a side elevation of the fastener looking from the left of Figure 1.

As best seen in Figure 3, the fastener comprises a housing formed from two plates 20 and 12 both of which are sector shape in configuration, the former being flat and the latter being formed with a channel which extends from the arcuate edge thereof to a location intermediate of the ends of the radial edges. Rotatable within the channel 21 is an element 11 having a spindle or boss 13 which extends up through a hole in the channel 12 and has pivotally secured thereto a manipulating handle 14. For this purpose the projecting end of the spindle is provided with a cross pin around which are folded lugs on one edge of the manipulating member. The spindle may also be provided with a hexagonal bore or socket 24 for engagement by a key and a slot 25 for engagement by a screw driver. A projection 15 is fixed to the plate 12 and when the manipulating handle is folded flat against the plate this projection extends through a hole in the manipulating member. The manipulating member is held in this position by a split pin which passes through a hole in the projection and lies over the outer face of the manipulating handle. The two plates may be brazed or welded together, and are provided with registering holes through which securing screws may be inserted for attaching the fastener to the closure wall of the container.

Figure 5:
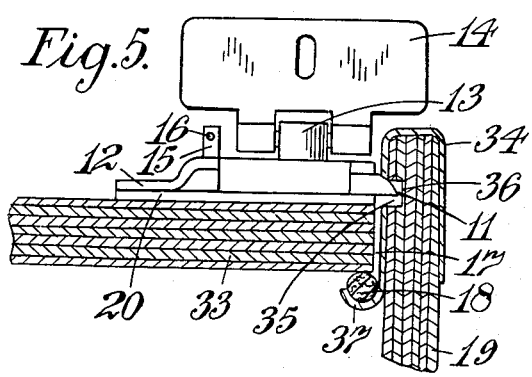
Figure 5 is a section through a part of a container showing the fastener in an intermediate position between release and clamping.
Figure 7:
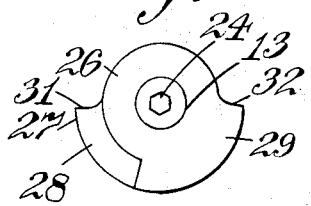
Figure 7 is a plan view of that element.
Figure 6:
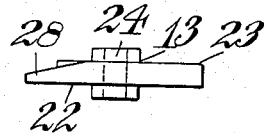
Figure 6 is a side elevation of the rotatable element of the fastener.

As best seen in Figures 6 and 7 the rotatable element 11 is provided with two adjoining half circular portions 26 and 27 the latter having a larger radius than the former and shaped to provide an arcuate wedge shaped part 28 on the upper face 23. The underface 22 of the rotatable element which abuts the plate 20 is flat, thus the element may be rotated into a position in which the thicker part 29 projects beyond the plates or it may be rotated into such a position that the larger radius portion 27 lies wholly between the plates. In order to locate the rotatable element 11 in either of these limiting positions a rivet 30 extends between the plates 12 and 20 in such a position as to engage either of the two shoulders 31, 32 formed between the two portions 26 and 27 of the rotatable element. As will be seen from Figure 5 the closure wall 33 to which the fastener is attached is disposed within an encircling wall 19. The edge of that wall is embraced by a sheet metal element 34 which is U-shaped in cross section and its inner flange 17 is provided with a slot 35 arranged opposite a recess 36 cut in the inner face of the wall 19. It is also provided with an inwardly directed portion 37 which carries a sealing strip 18. The U-shaped strip may embrace all four walls of the container whereby a sealing strip may be continuous around the walls. A number of fasteners as described above may be secured to the outer face of the closure wall and are arranged to co-operate with a like number of slots 35 in the U-shaped strip. With this arrangement when the closure wall 33 is placed in position the manipulating member 14 is rotated into a position in which the rotatable element 11 lies wholly within the two plates 12 and 20. When it is required to clamp the closure wall in position the manipulating member is rotated causing the wedge face 28 and then the thicker portion 29 of the rotatable element to project beyond the base effecting a wedging action which causes the closure wall 33 to be clamped firmly against the sealing strip 18.

It will be noted that the inwardly directed flange 37 and sealing strip 18 and the slot 35 are so located that when the closure wall 33 is firmly clamped against the sealing strip and the manipulating handle 14 is folded down the fastener lies wholly below the top edge of the encircling wall 19.

I claim:

1. A packing case comprising a surrounding wall, an internal abutment on said wall spaced away from a free edge thereof, a removable lid resting on said abutment, an inwardly directed shoulder on said wall outside said lid, a housing secured to the outside of the lid, a rotatable fastening element in said housing and having a cam face adapted during rotation to project from the housing, and to engage said shoulder and draw the lid against the abutment, a spindle fixed to the rotatable element and projecting through a bearing in said housing, a manipulating handle pivotally connected to said spindle, a projection on the housing arranged to extend through a hole in the manipulating member when the latter is swung flat against the housing, a hole in said projection for receiving a locking member.

2. A packing case according to claim 1 and having a metal plate secured against the inner face of said surrounding wall and formed with a slot to provide the aforesaid shoulder.

3. A packing case according to claim 1 and having a metal plate secured against the inner face of the surrounding wall and shaped to provide the aforesaid abutment and which plate is provided with a slot to form the aforesaid shoulder.

4. A packing case according to claim 1, wherein said free edge of said wall is encased in an inverted U-shaped metal plate one of the limbs of which is formed with an inwardly directed flange on the inner side of said wall and constituting the aforesaid abutment and is also formed with a slot which constitutes said shoulder.

5. A packing case according to claim 1, wherein said free edge of the surrounding wall is encased in an inverted U-shaped metal plate having an inwardly directed flange formed on that limb thereof on the inner face of the wall, a sealing strip supported by said flange and a slot formed in said plate to provide the aforesaid shoulder.

6. A packing case comprising a surrounding wall, an internal abutment on said wall spaced away from a free edge thereof, a removable lid resting on said abutment, an inwardly directed shoulder on said wall outside said lid, a housing secured to the outside of the lid, a comparatively thin plate formed with a cam face, a bearing in the housing, a spindle fixed to the plate and extending through said bearing, which cam face on said thin plate is adapted during rotation to project from the housing and engage said shoulder and to draw the lid against the abutment, a manipulating handle hinged to said spindle and adapted also to lie beneath said free edge and locking means adapted to hold the hinged handle beneath said free edge.

7. A packing case comprising a surrounding wall, an internal abutment on said wall spaced away from a free edge thereof, a removable lid resting on said abutment, an inwardly directed shoulder on said wall outside said lid, a housing secured to the outside of said lid and comprising two sector shaped plates arranged face to face and shaped to provide a recess extending to one edge of the plates, a rotatable fastening element within said recess and having a face adapted during rotation of the element to project beyond the arcuate portions of the plates and to engage said shoulder and to draw the lid against the abutment.

8. A packing case comprising a surrounding wall, an internal abutment on said wall spaced away from a free edge thereof, a removable lid resting on said abutment, an inwardly directed shoulder on said wall outside said lid, a housing secured to the outside of the lid and comprising two sector shaped plates arranged face to face, one of which plates is flat and the other is recessed to form a channel on its inner face, a rotatable fastening element in said channel having a face adapted during rotation of the element to project from the housing to engage said shoulder and to draw the lid against the abutment, a spindle fixed to the rotatable element extending through a hole in the bottom of the channel.

References Cited in the file of this patent

UNITED STATES PATENTS

| | | |
|---|---|---|
| 212,487 | Morris | Feb. 18, 1879 |
| 619,233 | Schraudner | Feb. 7, 1899 |
| 707,858 | Mendenhall | Aug. 26, 1902 |
| 1,197,153 | Robinson | Sept. 5, 1916 |
| 1,198,166 | Stoddard | Sept. 12, 1916 |
| 1,215,355 | Ellinger | Feb. 13, 1917 |
| 1,563,070 | Brandau | Nov. 24, 1925 |
| 1,783,150 | Jeffery | Nov. 25, 1930 |
| 2,263,843 | Gross | Nov. 25, 1941 |